United States Patent [19]

Arendt

[11] 3,833,349

[45] Sept. 3, 1974

[54] CERAMIC ARTICLES AND METHOD OF SEALING CERAMICS

[75] Inventor: Ronald H. Arendt, Schenectady, N.Y.

[73] Assignee: General Electric Company, Schenectady, N.Y.

[22] Filed: Sept. 15, 1972

[21] Appl. No.: 289,430

Related U.S. Application Data

[62] Division of Ser. No. 138,305, April 28, 1971, Pat. No. 3,719,550.

[52] U.S. Cl. ................... 65/43, 156/89, 161/182
[51] Int. Cl. ............................................. C03c 27/00
[58] Field of Search ......... 65/43; 156/89; 106/39 R, 106/39 DV, 42, 55, 62, 65; 161/182, 188

[56] References Cited
UNITED STATES PATENTS

| | | | |
|---|---|---|---|
| 2,749,668 | 6/1956 | Chaffotte et al. | 65/43 |
| 3,281,309 | 10/1966 | Ross | 65/43 X |
| 3,467,510 | 9/1969 | Knochel et al. | 156/89 X |
| 3,588,573 | 6/1971 | Chew et al. | 106/73.2 X |
| 3,594,144 | 7/1971 | Acello | 65/43 |
| 3,623,921 | 11/1971 | Behringer et al. | 106/62 X |

*Primary Examiner*—S. Leon Bashore
*Assistant Examiner*—Kenneth M. Schor
*Attorney, Agent, or Firm*—Gerhard K. Adam; Joseph T. Cohen; Jerome C. Squillaro

[57] ABSTRACT

A method of forming a seal between high-density yttria bodies or between a high-density yttria body and a high-density alumina body is provided. The method involves placing an $Al_2O_3$-$Ga_2O_3$-$Y_2O_3$ mixture between the bodies to be sealed and heating the mixture to a temperature above the melting point of $Ga_2O_3$ and below the deformation temperature of the bodies such that an $Al_2O_3$-$Ga_2O_3$-$Y_2O_3$ seal forms between the bodies. Ceramic articles having a gas tight seal are made by the method.

9 Claims, No Drawings

CERAMIC ARTICLES AND METHOD OF SEALING CERAMICS

This is a division of application Ser. No. 138,305, filed Apr. 28, 1971, now U.S. Pat. No. 3,719,550.

Yttria ceramics have been discussed in considerable detail in an article by R. C. Anderson, High Temperature Oxides, Vol. 2, Academic Press (1970) pages 1–40. The article discloses that $Y_2O_3$ ceramics have been sintered to a state of optical transparency with and without the use of pressure. Dense $Y_2O_3$ of good optical quality, having appreciable transmission extending from $0.3\mu$ in the ultraviolet to above $8\mu$ into the infrared, has been prepared by press forging. U.S. Pat. No. 3,545,987, to R. C. Anderson, discloses a high-density yttria-based polycrystalline ceramic body containing 2–15 mole percent of $ThO_2$. Transparent ceramics containing about 90 percent $Y_2O_3$ and 10 percent $ThO_2$ are commercially available under the trademark YTTRALOX optical ceramics. This is a single phase, polycrystalline material with a grain size between 10 and 50 micrometers in diameter. It is produced in the form of disks, plates, tubes and rods. Some of the outstanding properties of YTTRALOX ceramic are its high melting point, making it useful for infrared windows and lenses in high temperature applications and its electrical properties making it useful in electrical devices, e.g. substrates for electronic circuitry. When forming structures of complex configurations it becomes necessary at times to bond or seal a preformed $Y_2O_3$ ceramic material to another body of the same composition.

High-density polycrystalline translucent alumina ceramics have been of considerable interest especially in the production of electrical discharge devices and lamps. R. L. Coble, U.S. Pat. No. 3,026,210, describes this material and a basic method of preparing it. The polycrystalline alumina bodies disclosed in the Coble patent consist of at least 99.5 percent alumina and are very dense, having essentially no porosity. For this reason, the material is well-suited for use in the manufacture of lamp envelopes. Also, envelopes constructed from high-density polycrystalline alumina withstand attack by alkali metal vapors at high operating temperatures and pressures and can, therefore, be used in the manufacture of lamps such as sodium and cesium vapor lamps. In order to construct a practical and useful lamp it is necessary to tightly seal the structure. Lamps may also be formed by sealing a transparent high-density yttria window to a high-density polycrystalline alumina envelope.

Heretofore, R. J. Charles et al., U.S. Pat. No. 3,545,639 disclosed a glass bonding composition consisting essentially of barium oxide, magnesium oxide, calcium oxide and alumina for bonding high-density alumina bodies to bodies of the same composition or to bond refractory metal seals to the alumina bodies. The composition is one which undergoes a peritectic decomposition during cooling and rapidly crystallizes at a eutectic producing an extremely fine-grained ceramic seal.

In accordance with the present invention, I have discovered a method of forming a seal between a high-density yttria body with another high-density yttria body or with a high-density alumina body by placing between the portions of the bodies to be sealed an aqueous slurry comprising an inorganic mixture consisting essentially of $Al_2O_3$, $Ga_2O_3$ and $Y_2O_3$, and an organic binder, drying the aqueous slurry, firing the composite bodies at a temperature above the melting point of $Ga_2O_3$ and below the deformation temperature of the bodies whereby the organic binder is removed and at least a portion of the inorganic mixture initially forms a liquid phase that is transformed to a solid $Al_2O_3$-$Ga_2O_3$-$Y_2O_3$ seal at the interface between said bodies, and cooling the sealed bodies. I have found that gas tight seals are formed between yttria-yttria bodies or yttria-alumina bodies by the above-described process.

Broadly, the procedure and composition for forming seals by my method between yttria-yttria bodies or yttria-alumina bodies are similar and unless otherwise stated should be considered the same. Some variations or modifications do exist in the inorganic mixture composition and in the temperature range at which the seal is formed.

Phase diagrams for the binary mixtures are disclosed by E. M. Levin et al., Phase Diagrams for Ceramists, and the 1969 Supplement, published by The American Ceramic Society. The $Al_2O_3$-$Ga_2O_3$ system is given FIG. 310; the $Ga_2O_3$-$Y_2O_3$ system is given in FIG. 340; and the $Al_2O_3$-$Y_2O_3$ system is given in FIG. 2344. The phase diagram for the $Al_2O_3$-$Ga_2O_3$ system indicates that at temperatures above the melting point of $\beta$-$Ga_2O_3$ (about 1,740° C.) a liquid phase exists and that as the temperature is increased more $Al_2O_3$ goes into the liquid phase. All three phase diagrams of the binary pairs show that solid solutions are formed. This data leads to a strong implication that in the ternary system one or more solid solutions exist.

In forming the seal between high-density yttria bodies (which also broadly includes those materials in which there is a minor amount of another ingredient such as illustrated by YTTRALOX transparent ceramics) the inorganic mixture consists essentially of 5–30 mole percent of $Al_2O_3$, 40–60 mole percent $Ga_2O_3$ and 10–55 mole percent of $Y_2O_3$. The composition in forming a seal between a high-density yttria body and a high-density alumina body (which may be polycrystalline or a single crystal material, e.g. sapphire) varies slightly in that the alumina required for the seal may be obtained directly by dissolution at the surface of the alumina body. Thus the inorganic mixture for use in sealing the latter bodies consists essentially of 0–30 mole percent $Al_2O_3$, 40–60 mole percent $Ga_2O_3$ and 10–60 mole percent $Y_2O_3$. In forming either seals, there must be sufficient alumina present or dissolved to form an $Al_2O_3$-$Ga_2O_3$-$Y_2O_3$ liquid phase. This liquid phase acts to wet or dissolve the surface of the bodies being sealed and fill the void spaces between undissolved particles (aggregate phase). In forming a seal between high-density yttria bodies, the presence of the $Al_2O_3$ appears to facilitate bonding by lowering the temperature at which the surfaces of the bodies are dissolved.

Initially, the inorganic oxides in fine particulate form are dry mixed into a homogeneous mixture. Thereafter the mixture is applied between high-density yttria bodies or the high-density yttria body and the high-density alumina body using a procedure similar to that of applying solder sealing glasses as described by E. B. Shand, Glass Engineering Handbook, Second Edition (1958) pages 127–128. Thus, the $Al_2O_3$, $Ga_2O_3$ and $Y_2O_3$ mixture can be suspended in a volatile liquid, preferably water to form a slurry. Organic binders, such as polyvinyl alcohol and polyimides, are usually added to the slurry, and a firing is required to ensure that the binder is eliminated. This mixture may be applied to the surfaces being sealed by coating, spraying or flowing. After the coating has been applied, the volatile liquid is removed by drying the slurry.

The composite body is now fired to form a liquid phase of at least a portion of the inorganic mixture, that is subsequently transformed to a solid solution, at the interface between the bodies being sealed. As shown in the phase diagrams referred to hereinbefore, the firing temperature must be above the melting point of $Ga_2O_3$ in order to form a liquid phase. As the temperature is increased the $Al_2O_3$-$Ga_2O_3$-$Y_2O_3$ liquid phase is formed. At the same time, the temperature should not exceed the deformation point of the bodies to be sealed. The preferred temperature for the sealing of yttria bodies is in the range of about 1,750°–1,950° C.; while the preferred temperature for sealing high-density yttria to high-density alumina bodies is in the range of about 1,750°–1,850° C. At these temperatures the inorganic oxides appear to dissolve in the liquid phase until a solid solution is formed. During solidification it is postulated that a graded seal is formed at the interface between yttria or alumina bodies and the sealing composition, since as the yttria or alumina is dissolved the area adjacent to the surface is richer in the dissolved oxide. While the firing time is not critical, it is recommended that at the preferred temperatures the time be about 5–120 minutes. Subsequently, the sealed composite is cooled to room temperature. It was observed that a gas tight seal is formed.

My invention is further illustrated by the following examples:

EXAMPLE I

An inorganic mixture of 0.2598 gram of $Al_2O_3$, 2.6337 grams of $Ga_2O_3$ and 2.1137 grams of $Y_2O_3$ was prepared to give approximately a 10:56:34 molar composition respectively. The powdered oxides were dry mixed overnight in a polyethylene container to form a homogeneous mixture. To this mixture was added an aqueous solution containing 2 percent by weight of polyvinyl alcohol such that a viscous slurry was formed. The slurry was then applied between a polycrystalline yttria cylinder and a polycrystalline yttria disk to form a coating between the two bodies. Thereafter the slurry was air-dried.

The composite material was placed in a molybdenum element furnace and fired in a hydrogen atmosphere at temperatures of between 1,750°–1,950° C. for various periods of time ranging from 5 minutes to 2 hours. The heating rate was in excess of 2,000° per hour. The composite body was then rapidly cooled to room temperature.

The sealed yttria composite article was found to be leaktight to gaseous helium. Attempts to separate the two bodies indicated a very strong seal had been formed between them. At temperatures below 1,750° C. no bond formation occurred.

EXAMPLE II

Following the procedure and using the aqueous slurry of Example I wherein the inorganic mixture of $Al_2O_3$:$Ga_2O_3$:$Y_2O_3$ was in a molar ratio of 10:54:36, a high-density yttria ceramic disk was sealed to a high-density alumina ceramic tube at a firing temperature of 1,750°–1,850° C.

The bond was substantially identical in strength to that of Example I and a vacuum tight seal was obtained.

EXAMPLE III

Using the procedure of Example II, a high-density yttria disk was sealed to a high-density alumina tube using a slurry prepared from an inorganic mixture of 2.7824 grams $Ga_2O_3$ and 2.2234 grams of $Y_2O_3$ to give approximately a 60:40 molar composition respectively. The composite material was fired at temperatures from 1,750°–1,850° C. and good seals were obtained. This may be explained by the fact that a portion of the alumina from the tube being sealed had dissolved and become part of the seal composition.

Attempts to seal two high-density yttria ceramic bodies using the same composition and firing to a temperature of 1,900° C. failed to give a satisfactory seal. This indicates that in order to obtain dissolution or reaction at the surface of the high-density yttria ceramic, $Al_2O_3$ must be present in the sealing composition.

EXAMPLE IV

Following the procedures of Examples I and II, a slurry was prepared from an inorganic mixture of 0.5585 gram $Al_2O_3$, 2.465 grams of $Ga_2O_3$ and 1.979 gram of $Y_2O_3$ which had a molar ratio of $Al_2O_3$:$Ga_2O_3$:$Y_2O_3$ of 20:48:32.

Satisfactory seals are obtained using an aqueous slurry as described hereinabove to seal (a) a high-density yttria ceramic tube to a high-density yttria ceramic disk, and (b) a high-density alumina ceramic tube to a high-density yttria ceramic disk.

It will be appreciated that the invention is not limited to the specific details shown in the examples and illustrations and that various modifications may be made within the ordinary skill in the art without departing from the spirit and scope of the invention.

I claim:

1. A method of forming a seal between high-density yttria bodies or between a high-density yttria body and a high-density alumina body, said method comprising the steps of:
    a. placing between the portions of said bodies to be sealed a coating of a slurry comprising an inorganic oxide portion consisting essentially of 0–30 mole percent $Al_2O_3$, 40–60 mole percent $Ga_2O_3$ and 10–60 mole percent $Y_2O_3$, the amount of $Al_2O_3$ being at least 5 mole percent when forming a seal between high-density yttria bodies, and a liquid phase,
    b. drying the slurry to remove the liquid phase,
    c. firing the coated bodies at a temperature above the melting point of $Ga_2O_3$ and below the deformation temperatures of said bodies such that a solid solution is formed, and
    d. cooling the sealed bodies.

2. The method of claim 1, wherein said slurry is aqueous and contains an organic binder.

3. The method of claim 1, wherein the seal is formed between high-density yttria bodies, said inorganic oxide portion consists essentially of 5–30 mole percent $Al_2O_3$, 40–60 mole percent $Ga_2O_3$ and 10–55 mole percent $Y_2O_3$, and said firing occurs at a temperature of from 1,750°–1,950° C.

4. The method of claim 3, wherein said yttria bodies are high-density yttria-based polycrystalline ceramics containing from 2–15 mole percent $ThO_2$.

5. The method of claim 4, wherein said inorganic oxide portion consists of about 10 mole percent $Al_2O_3$, 56 mole percent $Ga_2O_3$, and 34 mole percent $Y_2O_3$ and said firing temperature is about 1,900° C.

6. The method of claim 1, wherein the seal is formed between a high-density yttria body and a high-density alumina body, and said firing occurs at a temperature of 1,750°–1,850° C.

7. The method of claim 6, wherein said yttria body is a high-density yttria-based polycrystalline ceramic containing 2–15 mole percent $ThO_2$ and wherein said alumina body is a high-density polycrystalline translucent alumina consisting essentially of at least 99.5 weight percent $Al_2O_3$.

8. The method of claim 7, wherein said inorganic portion consists essentially of 10 mole percent $Al_2O_3$, 56 mole percent $Ga_2O_3$ and 34 mole percent $Y_2O_3$.

9. The method of claim 7, wherein said inorganic portion consists essentially of 60 mole percent of $Ga_2O_3$ and 40 mole percent $Y_2O_3$.

* * * * *